United States Patent [19]
Sandor et al.

[11] Patent Number: 6,103,372
[45] Date of Patent: Aug. 15, 2000

[54] FILLED CUT-RESISTANT FIBER

[75] Inventors: Robert Bruce Sandor, South Orange, N.J.; Michele C. Carter, Del Rio, Tex.; Gunilla E. Gillberg-LaForce, Summit, N.J.; William F. Clear, Huntersville, N.C.; John A. Flint, Berkeley Heights; Herman Leslie Lanieve, Warren, both of N.J.; Scott W. Thompson, Charlotte; Etheridge Odell Oakley, Jr., Matthews, both of N.C.; Edward Ronald Kafchinski, Winfield; Mohammed Ishaq Haider, Bernardsville, both of N.J.

[73] Assignee: Hoechst Celanese Corporation, Summit, N.J.

[21] Appl. No.: 09/212,124

[22] Filed: Dec. 15, 1998

Related U.S. Application Data

[60] Division of application No. 08/752,297, Nov. 19, 1996, Pat. No. 5,851,668, which is a continuation-in-part of application No. 08/243,344, May 16, 1994, abandoned, which is a continuation-in-part of application No. 07/980,813, Nov. 24, 1992, abandoned, which is a continuation-in-part of application No. 08/482,207, Jun. 7, 1995, abandoned, and application No. 08/243,344, which is a division of application No. 08/484,544, Jun. 7, 1995, abandoned, and a division of application No. 08/481,020, Jun. 7, 1995, abandoned.

[51] Int. Cl.⁷ .................................................. D02G 3/00
[52] U.S. Cl. ........................ 428/364; 428/332; 428/359; 428/327; 428/333
[58] Field of Search .......................... 264/301; 428/35.3, 428/35.8, 359, 36.1, 148, 292, 303, 311.5, 327, 332, 333, 364

[56] References Cited

U.S. PATENT DOCUMENTS

| | | |
|---|---|---|
| 2,328,105 | 8/1943 | Strobino .................................. 250/108 |
| 2,819,173 | 1/1958 | Dithmar et al. . |
| 3,185,751 | 5/1965 | Sulton .................................... 264/301 |
| 3,331,806 | 7/1967 | Fior et al. . |
| 3,361,616 | 1/1968 | Scharf et al. . |
| 3,522,342 | 7/1970 | Nungesser et al. . |
| 3,607,374 | 9/1971 | Seibel et al. . |
| 3,616,184 | 10/1971 | Katagiri et al. . |
| 3,803,453 | 4/1974 | Hull . |
| 3,823,035 | 7/1974 | Sanders . |
| 3,869,339 | 3/1975 | Dhingra . |
| 4,004,295 | 1/1977 | Byrnes, Sr. . |
| 4,067,852 | 1/1978 | Calundann . |
| 4,098,757 | 7/1978 | Gordon . |
| 4,254,182 | 3/1981 | Yamaguchi et al. . |
| 4,384,449 | 5/1983 | Byrnes, Sr. et al. . |
| 4,451,534 | 5/1984 | Akagi et al. . |
| 4,470,251 | 9/1984 | Bettcher . |
| 4,473,682 | 9/1984 | Calundann et al. . |
| 4,507,361 | 3/1985 | Twilley et al. . |
| 4,522,974 | 6/1985 | Calundann et al. . |
| 4,525,384 | 6/1985 | Aoki . |
| 4,533,685 | 8/1985 | Hudgin et al. . |
| 4,540,737 | 9/1985 | Wissbrun et al. . |
| 4,545,926 | 10/1985 | Fouts, Jr. et al. . |
| 4,557,857 | 12/1985 | Sorensen . |
| 4,582,872 | 4/1986 | Hudgin et al. . |
| 4,585,464 | 4/1986 | Haylock et al. . |
| 4,592,961 | 6/1986 | Ehrreich . |
| 4,626,371 | 12/1986 | Ikenaga et al. . |
| 4,670,203 | 6/1987 | Chang . |
| 4,744,802 | 5/1988 | Schwabel . |
| 4,778,820 | 10/1988 | Minnick . |
| 4,799,985 | 1/1989 | McMahon et al. . |
| 4,830,779 | 5/1989 | Maeno et al. . |
| 4,871,790 | 10/1989 | Lamanna et al. . |
| 4,886,691 | 12/1989 | Wiucklhofer . |
| 4,888,127 | 12/1989 | Wada et al. . |
| 4,912,781 | 4/1990 | Robins et al. . |
| 4,921,755 | 5/1990 | Carroll, Jr. et al. . |
| 4,923,741 | 5/1990 | Kosmo et al. . |
| 4,945,687 | 8/1990 | Scheider et al. . |
| 4,960,818 | 10/1990 | Reilly et al. . |
| 5,020,161 | 6/1991 | Lewis, Jr. et al. ........................ 2/164 |
| 5,053,275 | 10/1991 | Kagechi et al. . |
| 5,069,803 | 12/1991 | Sugimura et al. . |
| 5,086,158 | 2/1992 | Hayashi . |
| 5,087,499 | 2/1992 | Sullivan . |
| 5,091,252 | 2/1992 | Hruska et al. . |
| 5,104,602 | 4/1992 | Landry et al. . |
| 5,119,512 | 6/1992 | Dunbar et al. . |
| 5,179,192 | 1/1993 | Kanaka et al. . |

(List continued on next page.)

FOREIGN PATENT DOCUMENTS

| | | |
|---|---|---|
| 01 15967 A3 | 8/1984 | European Pat. Off. . |
| 0 261 430 | 3/1988 | European Pat. Off. . |
| 03 76323 A2 | 7/1990 | European Pat. Off. . |
| 04 58343 A1 | 11/1991 | European Pat. Off. . |
| 0599231 A1 | 11/1993 | European Pat. Off. . |
| 55/98909 | 7/1980 | Japan . |
| 259062 | 10/1989 | Japan . |
| 91/130413 | 10/1989 | Japan . |
| 45737 | 2/1991 | Japan . |
| 5-331299 | 12/1993 | Japan . |
| 59/112018 | 6/1994 | Japan . |
| 200624 2A | 5/1979 | United Kingdom . |
| WO 94/11549 | 5/1994 | WIPO . |
| WO 95/31593 | 11/1995 | WIPO . |

OTHER PUBLICATIONS

K. Turek et al., "Magnetic Fibers," *J. Magn. Magn. Mater,,* 83 (19909), pp. 279–280.

"Encyclopedia of Polymer Science and Engineering" vol. 6, John Wiley & Sons, New York, 1985, pp. 828–831.

Patent Abstracts of Japan, vol. 014, No. 197 (C–0712), Apr. 23, 1990 & JP,A,02 038444 (Toray Ind Inc), 7, Feb., 1990.

*Primary Examiner*—Merrick Dixon
*Attorney, Agent, or Firm*—Alston & Bird LLP

[57] ABSTRACT

A fiber having increased cut resistance is made from a fiber-forming polymer and a hard filler having a Mohs Hardness Value greater than about 3. The filler is included in an amount of about 0.05% to about 20% by weight. In preferred embodiments, the fiber-forming polymer is poly (ethylene terephthalate) or a liquid crystalline polyester comprising monomer units derived from 6-hydroxy-2-naphthoic acid and 4-hydroxybenzoic acid. Preferred fillers include tungsten and alumina.

6 Claims, No Drawings

U.S. PATENT DOCUMENTS

| | | |
|---|---|---|
| 5,190,819 | 3/1993 | Landry et al. . |
| 5,204,443 | 4/1993 | Lee et al. . |
| 5,229,451 | 7/1993 | Carter et al. . |
| 5,296,543 | 3/1994 | Kasowski et al. . |
| 5,298,028 | 3/1994 | Hsu . |
| 5,298,194 | 3/1994 | Carter et al. . |
| 5,312,789 | 5/1994 | Wood . |
| 5,442,815 | 8/1995 | Cordova et al. . |
| 5,475,046 | 12/1995 | Son et al. . |

FILLED CUT-RESISTANT FIBER

CONTINUATION APPLICATION DATA

This application is a divisional of U.S. application Ser. No. 08/752,297 filed Nov. 19, 1996 now U.S. Pat. No. 5,851,668, which is a continuation-in-part of U.S. application Ser. No. 08/243,344, filed May 16, 1994, now abandoned, which is a continuation-in-part of U.S. application Ser. No. 07/980,813, filed Nov. 24, 1992, now abandoned; and which is also a continuation-in-part of U.S. application Ser. No. 08/482,207, filed Jun. 7, 1995, now abandoned. U.S. application Ser. Nos. 08/484,544 and 08/481,020, both of which were filed Jun. 7, 1995, which are divisionals of U.S. application Ser. No. 08/243,344, also contain related subject matter and are also now abandoned.

FIELD OF THE INVENTION

This invention relates to fibers made from polymers containing hard particles that have improved resistance to cutting.

BACKGROUND OF THE INVENTION

Improved resistance to cutting with a sharp edge has long been sought. Cut-resistant gloves are beneficially utilized in the meat-packing industry and in automotive applications. As indicated by U.S. Pat. Nos. 4,004,295, 4,384,449 and 4,470,251, and by EP 458,343, gloves providing cut resistance have been made from yarn which includes flexible metal wire or which consists of highly oriented fibers having high modulus and high tensile strength, such as aramids, thermotropic liquid crystalline polymers, and extended chain polyethylene.

A drawback with gloves made from yarn that includes flexible metal wire is hand fatigue with resultant decreased productivity and increased likelihood of injury. Moreover, with extended wear and flexing, the wire may fatigue and break, causing cuts and abrasions to the hands. In addition, the wire will act as a heat sink when a laundered glove is dried at elevated temperatures, which may reduce tensile strength of the yarn or fiber, thereby decreasing glove protection and glove life.

Improved flexibility and comfort and uncomplicated laundering are desirable in cut-resistant, protective apparel. Therefore, there is a need for a flexible, cut-resistant fiber that retains its properties when routinely laundered. Such a fiber may be advantageously used in making protective apparel, in particular highly flexible, cut-resistant gloves.

Polymers have been mixed with particulate matter and made into fibers, but not in a way that significantly improves the cut resistance of the fiber. For example, small amounts of particulate titanium dioxide has been used in polyester fiber as a delustrant. Also used in polyester fiber is a small amount of colloidal silicon dioxide, which is used to improve gloss. Magnetic materials have been incorporated into fibers to yield magnetic fibers. Examples include: cobalt/rare earth element intermetallics in thermoplastic fibers, as in published Japanese Patent Application No. 55/098909 (1980); cobalt/rare earth element intermetallics or strontium ferrite in core-sheath fibers, described in published Japanese Patent Application No. 3-130413 (1991); and magnetic materials in thermoplastic polymers, described in Polish Patent No. 251,452 and also in K. Turek et al., *J. Magn. Magn. Mater.* (1990), 83 (1–3), pp. 279–280.

Various kinds of gloves have been made in which metal has been included in the fabrication of the glove to impart protective qualities to the glove. For example, U.S. Pat. Nos. 2,328,105 and 3,185,751 teach that a flexible, X-ray shield glove may be made by treating sheets of a suitable porous material with a finely divided, heavy metal which may be lead, barium, bismuth or tungsten, or may be made from a latex or dispersion containing heavy metal particles. As illustrated by U.S. Pat. No. 5,020,161, gloves providing protection against corrosive liquids have been made with a metal film layer. These gloves also do not appear to have significantly improved cut resistance.

SUMMARY OF THE INVENTION

A cut-resistant fiber and yarns based on that fiber are made from a fiber-forming polymer by including a hard filler distributed uniformly in the fiber. The hard filler has a Mohs Hardness value greater than about 3 and is present in an amount of about 0.05% to about 20% by weight. The fiber has cut resistance properties that are improved by at least 10% compared with the same fiber without the hard filler as measured by the Ashland Cut Protection Performance Test, described below. A method of making cut-resistant fabric is also taught. In this method, a uniform blend of a fiber-forming polymer and about 0.05% to about 20% by weight of a hard filler having a Mohs Hardness value greater than about 3 is made. The uniform blend is spun into a fiber or yarn, which is then fabricated into fabric having improved cut resistance in comparison with fabric made from the same fiber-forming polymer without the hard filler. The cut-resistant fabric may optionally also include other polymeric fibers and/or reinforcing inorganic fibers, which may be ceramic, metal or glass.

A new method of making a synthetic fiber or yarn more resistant to cutting with a sharp edge is also disclosed. The improved method comprises the step of including a hard filler having a Mohs hardness value greater than 3 in the synthetic fiber or yarn in sufficient quantity to improve the cut protection of the fiber or yarn by at least 20%, and preferably by at least 35%, as measured by the Ashland Cut Protection Performance Test. This is generally achieved by making a uniform blend of the molten polymer or polymer solution (dope) and then spinning the molten polymer or polymer solution (dope) into a fiber or yarn having improved cut protection performance. The preferred method is melt spinning.

The fibers and yarns described above can be made into fabrics that have improved resistance to cutting using any of the methods that are currently used for making fibers and yarns into fabrics, including weaving and knitting. The fibers and yarns can also be made into non-woven fabrics that have improved cut-resistance. Both the fabrics and the methods of making cut-resistant fabrics and the resulting fabrics are new. Additionally, the cut-resistant fabrics are made into apparel with improved cut protection, such as gloves that are resistant to slicing with a knife.

DETAILED DESCRIPTION OF THE INVENTION

As indicated above, a flexible cut-resistant fiber useful for the manufacture of protective apparel may be produced when a hard filler is included in the fiber. The fiber may be made of any fiber-forming polymer, and may be produced by any of the methods normally used in making fibers. The polymer preferably is melt processable, in which case, the cut-resistant fiber is typically made by melt spinning. For polymers that cannot be spun into fibers in the melt, wet spinning and dry spinning may also be used to produce fibers having improved cut resistance. Amorphous polymers, semi-crystalline polymers and liquid crystalline polymers may all be used in this invention. Of these, semi-crystalline and liquid crystalline polymers are preferred.

The description of this invention is written with respect to fibers. The term fiber includes not only conventional single fibers and filaments, but also yarns made from a multiplicity of these fibers. In general, yarns are utilized in the manufacture of apparel, fabrics and the like.

In one preferred embodiment of this invention, the fiber-forming polymer is an isotropic semi-crystalline polymer. "Isotropic" means polymers that are not liquid crystalline polymers, which are anisotropic. Preferably, the isotropic semi-crystalline polymer is melt processable; i.e., it melts in a temperature range which makes it possible to spin the polymer into fibers in the melt phase without significant decomposition. Semi-crystalline polymers that will be highly useful include poly(alkylene terephthalates), poly(alkylene naphthalates), poly(arylene sulfides), aliphatic and aliphatic-aromatic polyamides, and polyesters comprising monomer units derived from cyclohexanedimethanol and terephthalic acid. Examples of specific semi-crystalline polymers include poly(ethylene terephthal ate), poly(butylene terephthal ate), poly(ethylene naphthalate), poly(phenylene sulfide), poly(1,4-cyclohexanedimethanol terephthalate), wherein the 1,4-cyclohexanedimethanol is a mixture of cis and trans isomers, nylon-6 and nylon-66. Polyolefins, particularly polyethylene and polypropylene, are other semi-crystalline polymers that may be used in this invention. Extended chain polyethylene, which has a high tensile modulus, is made by the gel spinning or the melt spinning of very or ultrahigh molecular weight polyethylene. Extended chain polyethylene already has a high cut resistance, but can be made even more cut resistant by adding particles to the fiber in accordance with this invention. All of the above polymers are known to be useful for making fibers and are all commercially available. The preferred semi-crystalline isotropic polymer is poly(ethylene terephthalate). Isotropic polymers that cannot be processed in the melt can also be used, as for example rayon and cellulose acetate, which are typically dry spun using acetone as a solvent, and poly [2,2'-(m-phenylene)-5,5'-bibenzimidazole], generally referred to as polybenzimidazole, which is typically wet spun using N,N'-dimethylacetamide as a solvent. Aromatic polyamides other than the polymer of terephthalic acid and p-phenylene diamine (e.g. polymers of terephthalic acid and one or more aromatic diamines) may be soluble in polar aprotic solvents, such as N-methylpyrrolidinone, and can be wet spun with added particles to yield cut-resistant fibers. Amorphous, non-crystalline, isotropic polymers, such as the copolymer of isophthalic acid, terephthalic acid and bisphenol A (polyarylate) may also be filled and utilized in this invention.

In another preferred embodiment, the fiber is made from a liquid crystalline polymer (LCP). LCPs give fibers with very high tensile strength and/or modulus. The liquid crystalline polymer may be processable in the melt (i.e., thermotropic), in which case melt spinning is the preferred method of making the fiber. However, polymers that cannot be processed in the melt may also be utilized. Thus, polymers that exhibit liquid crystalline behavior in solution can be blended with a hard filler and then can be wet or dry spun to yield cut-resistant fibers in accordance with the present invention. For example, the aromatic polyamide made from p-phenylenediamine and terephthalic acid (as for example polymers sold under the KEVLAR® trademark) can be filled and wet spun (i.e. by dry-jet wet-spinning from a concentrated sulfuric acid solution) to yield a cut-resistant fiber, provided that the hard filler does not react with or dissolve in the solvent. Other aromatic polyamides that are soluble in polar aprotic solvents, such as N-methylpyrrolidinone, may also be spun into cut resistant fibers according to the present invention. See Example 10. These may not be liquid crystalline under some or all conditions, but they still yield high modulus fibers. Some may exhibit lyotropic liquid crystalline phases at some concentrations and in some solvents, but isotropic solutions at other concentrations or in other solvents.

The preferred liquid crystalline polymers (LCPs) for use in this invention are thermotropic LCPs. These thermotropic LCPs include aromatic polyesters, aliphatic-aromatic polyesters, aromatic poly(esteramides), aliphatic-aromatic poly(esteramides), aromatic poly(esterimides), aromatic poly(estercarbonates), aromatic polyamides, aliphatic-aromatic polyamides and poly(azomethines). The preferred thermotropic LCPs are aromatic polyesters and poly(esteramides) which form liquid crystalline melt phases at temperatures less than about 360 NC and include one or more monomer units derived from terephthalic acid, isophthalic acid, 1,4-hydroquinone, resorcinol, 4,4'-dihydroxybiphenyl, 4,4'-biphenyidicarboxylic acid, 4-hydroxybenzoic acid, 6-hydroxy-2-naphthoic acid, 2,6-naphthalenedicarboxylic acid, 2,6-dihydroxynaphthalene, 4-aminophenol, and 4-aminobenzoic acid. Some of the aromatic groups may include substituents which do not react under the conditions of the polymerization, such as lower alkyl groups having 1–4 carbons, aromatic groups, F, Cl, Br and I. The synthesis and structure of some typical aromatic polyester are taught in U.S. Pat. Nos. 4,473,682; 4,522,974; 4,375,530; 4,318,841; 4,256,624; 4,161,470; 4,219,461; 4,083,829; 4,184,996; 4,279,803; 4,337,190; 4,355,134; 4,429,105; 4,393,191; and 4,421,908. The synthesis and structures of some typical aromatic poly(esteramides) are taught in U.S. Pat. Nos. 4,339,375; 4,355,132; 4,351,917; 4,330,457; 4,351,918; and 5,204,443. Aromatic liquid crystalline polyesters and poly(esteramides) are available from Hoechst Celanese Corporation under the VECTRA® trademark, as well as from other manufacturers.

The most preferred liquid crystalline polyester comprises monomer repeat units derived from 4-hydroxybenzoic acid and 6-hydroxy-2-naphthoic acid, as taught in U.S. Pat. No. 4,161,470. Preferably, monomer units derived from 4-hydroxybenzoic acid comprise about 15% to about 85% of the polymer on a mole basis, and monomer units derived from 6-hydroxy-2-naphthoic acid comprise about 85% to about 15% of the polymer on a mole basis. Most preferably, the polymer comprises about 73% monomer units derived from 4-hydroxybenzoic acid and about 27% monomer units derived from 6-hydroxy-2-naphthoic acid, on a mole basis. This polymer is available in fiber form under the VECTRAN® trademark from Hoechst Celanese Corporation, Charlotte, N.C.

Other preferred liquid crystalline polyesters or poly(esteramides) comprise the above recited monomer units derived from 6-hydroxy-2-naphthoic acid and 4-hydroxybenzoic acid, as well as monomer units derived from one or more of the following monomers: 4,4'-dihydroxybiphenyl, terephthalic acid and 4-aminophenol. A preferred polyester comprising these monomer units is derived from 4-hydroxybenzoic acid, 6-hydroxy-2-naphthoic acid, 4,4'-biphenol and terephthalic acid, as taught in U.S. Pat. No. 4,473,682, with the polymer comprising these monomer units in a mole ratio of about 60:4:18:18 being particularly preferred.

A preferred poly(esteramide) comprises monomer units derived from 4-hydroxybenzoic acid, 6-hydroxy-2-naphthoic acid, terephthalic acid, 4,4'-biphenol and 4-aminophenol, as taught in U.S. Pat. No. 5,204,443; a highly preferred composition comprises these monomer units in a mole ratio of about 60:3.5:18.25:13.25:5.

An important aspect of this invention is the discovery that a flexible, flexural fatigue-resistant and cut-resistant fiber may be made from a suitable polymer filled with a hard material that imparts cut resistance. The material may be a metal, such as an elemental metal or metal alloy, or may be nonmetallic. Generally, any filler may be used that has a Mohs Hardness value of about 3 or more. Particularly suitable fillers have a Mohs Hardness value greater than about 4 and preferably greater than about 5. Iron, steel, tungsten and nickel are illustrative of metals and metal alloys, with tungsten, which has a Mohs hardness value ranging from about 6.5 to 7.5 being preferred. Non-metallic materials are also useful. These include, but are not limited to, metal oxides, such as aluminum oxide, metal carbides, such as tungsten carbide, metal nitrides, metal sulfides, metal silicates, metal suicides, metal sulfates, metal phosphates, and metal borides. Other examples include silicon dioxide and silicon carbide. Other ceramic materials may also be used. Titanium dioxide and silicon dioxide are less preferred in semi-crystalline polymers.

The particle size, particle size distribution, and the quantity of particles are all important parameters in obtaining good cut resistance while preserving fiber mechanical properties. A particulate form of the filler may be used, with a powder form being generally suitable. Flat particles (i.e. platelets) and elongated particles (needles) also can be utilized. For particles that are flat or elongated, the particle size refers to the length along the long axis of the particle (i.e. the long dimension of an elongated particle or the average diameter of the face of a platelet). Selection of an appropriate particle size depends on the processing and on the fiber diameter. The filler particles should be small enough to easily pass through the spinneret apertures. The particles should also be small enough that the fiber tensile properties do not appreciably deteriorate. For textile fibers, (i.e. fibers having a denier in the range of about 1.5 to about 15 dpf), the particles should be filtered or sieved in such a way that the particles larger than about 6 microns are excluded. In general, the particles should have an average diameter of less than about 20 microns, preferably in the range of about 0.05 to about 5 microns and in specific cases, about 0.2 to about 2 microns. For elongated particles, the long dimension should fit through the spinneret holes. Therefore, the average particle length of an elongated particle should be less than about 20 microns, and preferably is in the range of about 0.05 to about 5 microns and in specific cases, about 0.2 to 2 microns. The above is a general rule with respect to filled polymers in general. Further experimentation on hard particles in thermoplastic semicrystalline isotropic polymer indicates that at least for isotropic semi-crystalline polymers and particularly for the most preferred embodiment (calcined alumina in PET), the particle size ranges that yield the best cut resistance are about 0.25 to about 10 microns, preferably about 1 to about 6 microns, and most preferably about 3 microns. The particle size should have a log normal distribution.

A minor percentage of the hard filler is used. The amount is chosen to yield enhanced cut resistance without causing a significant loss of tensile properties. The cut resistance of the fiber or fabric made from the fiber is improved, preferably by at least 10%, using the Ashland Cut Protection Performance test or other tests generally accepted in the industry. Preferably, the cut protection measured by these tests, and particularly the Ashland Cut Protection Test, will improve by at least 20%, more preferably by at least 35% and most preferably by at least 50%. Such tests as applied to fibers of liquid crystalline polymers are described in Example 3, and as applied to fibers of isotropic polymers and LCP's are described in Example 4. The tensile properties of the fiber (tenacity and modulus) should not decrease by more than about 50% and preferably will not decrease by more than about 25%. Most preferably, there will not be a significant change in tensile properties (i.e., less than about 10% decrease in properties). On a weight basis, the filler is present in an amount of about 0.05% to about 20%, preferably about 0.1% to about 20%. On a volume basis, the amount of filler is typically in the range of about 0.01% to about 3%, often is in the range of about 0.03% to about 1.5%, and in specific cases may be in the range of about 0.05% to about 1%, with the proviso that the amount of filler is within the weight ranges stated previously. Thus, for a dense filler, such as tungsten powder in poly(ethylene terephthalate), the amount of filler corresponding to the volume percents stated above but expressed on a weight basis, is typically in the range of about 0.14% to about 20%, preferably in the range of about 0.42% to about 20%, and more preferably in the range of about 0.7% to about 14%. For PET, good cut resistant properties are obtained with about 0.7% by volume of tungsten filler, corresponding to about 10% by weight. For thermotropic liquid crystalline polymers, improved cut resistance can be obtained with about 0.07% to about 0.14% by volume of filler, corresponding to about 1% to about 2% by weight when the filler is tungsten.

Further experimentation with isotropic semicrystalline polymers indicates that a better estimate of the ranges of particle amounts required to achieve high cut resistance is as follows: On a volume basis, the particle level concentration is preferably in the range of about 0.1% to about 5% by volume, more preferably about 0.5% to about 3% by volume and most preferably about 2.1% by volume. For the most preferred embodiment (calcined alumina in PET), these ranges on a weight basis are about 0.3% to about 14% (preferred), about 1.4% to about 8.5% (more preferred), and about 6% (most preferred).

In accordance with the present invention, filled fibers are prepared from a filled resin. The filled resin is made by any of the standard methods for adding a filler to a resin. For example, for a thermoplastic polymer, the filled resin is conveniently prepared in an extruder, such as a twin screw extruder, by mixing the hard filler with molten polymer under conditions sufficient to provide a uniform distribution of the filler in the resin. The filler may also be present during the manufacture of the polymer or may be added as the polymer is fed into the extruder of fiber spinning equipment, in which case the blending and spinning steps are nearly simultaneous.

Since the filler is distributed uniformly in the polymer melt, the filler particles are also typically distributed uniformly throughout the fibers, except that elongated and flat particles are oriented to some extent because of the orientation forces during fiber spinning. Some migration of the particles to the surface of the fiber may also occur. Thus, while the distribution of particles in the fibers is described as "uniform", the word "uniform" should be understood to include non-uniformities that occur during the processing (e.g., melt spinning) of a uniform polymer blend. Such fibers would still fall within the scope of this invention.

Any size fiber may be made according to the present invention. In the manufacture of fabrics and yarns, the fiber will generally have a denier in the range of about 1 to about 50 dpf, preferably in the range of about 2 to about 20 dpf, and most preferably about 3 to about 15 dpf. For isotropic polymers, and particularly for filled PET the most preferred range of fiber size is about 1.5 to about 15 dpf, and most preferably about 4 dpf. Cut-resistant monofilaments may also be made by including a hard filler. Monofilaments generally have a diameter of about 0.05 to about 2mm. The fibers are made by conventional fiber spinning processes. The preferred process is melt-spinning, but wet-spinning and dry-spinning may also be used.

Cut-resistant fabric may be made by knitting, weaving, or other methods using a filled fiber in accordance with the present invention by using conventional methods and machinery. Non-woven fabrics can also be made. Such fabrics will have improved cut resistance in comparison with the same fabric made using fiber manufactured from the same polymer without a filler. Generally, the cut resistance will be improved by at least about 10% when measured using tests generally accepted in the industry for measuring cut resistance (the Ashland Cut Protection test), and preferably will be improved by at least 20%, 35% or even 50%.

Cut-resistant apparel may then be made from the cut-resistant fabric described above. For example, a cut-resistant safety glove designed for use in the food processing industries may be manufactured from the fabric. Such a glove is highly flexible and readily cleanable. The filled fiber resists flexural fatigue. Protective medical gloves may also be made using the cut-resistant fibers of this invention. These protective gloves can be sewn together from a fabric (woven, knit, or non-woven) that is made from the fibers and yarns taught herein. Alternatively, gloves can be knit directly from continuous yarns comprising the fiber, or pieces of fabric can be attached to gloves to protect the portions of the hand that are most at risk of being injured (e.g. palms or fingers). Other uses of the fabrics and monofilaments include side curtains and tarpaulins for trucks, softsided luggage, commercial upholstery, inflatables, fuel cells, collapsible packaging, airline cargo curtains, firehose sheaths, cut-resistant aprons for use in metal packing, chaps, etc.

Cut-resistant fiber materials described herein can also be substituted for unfilled polymeric fibers in cut-resistant fabrics, gloves and the like made by conventional methods to give even greater cut resistance. Thus, a cut-resistant fabric utilizing the filled fiber taught herein that is further reinforced by including a reinforcing inorganic fiber such as metal, glass or ceramic fiber, in accordance with current technology should have even greater cut resistance than the same fabric using a conventional fiber. Such fabrics may be made from composite yarns made up of strands of the filled fiber disclosed herein intermingled with strands of the metal, glass or ceramic reinforcing fiber, or from yarns of the filled fiber combined with yarns of the metal, glass or ceramic fiber, with or without a twist. Alternatively, the reinforcing fiber may be present as a core surrounded by the cut-resistant fibers disclosed herein, or the reinforcing fiber may be wrapped around a core comprising the filled cut resistant fiber described herein. Composite cut-resistant yarns of conventional fibers and reinforcing fibers are well known to practioners in the art and can readily be adapted to utilize the filled fibers taught herein as a substitute for conventional fibers. "Composite yarns" is an expression that is often used to describe yarns that are made by combining two different yarns, either with or without a twist. Composite yarns as defined above are also known in the trade as "combination yarns".

EXAMPLE 1

Preparation of Filled LCP

A tungsten powder-filled, melt-processable LCP is prepared as now described. An LCP (pellet form) (95 wt. %) manufactured under the registered trademark VECTRA® A910 (from Hoechst Celanese Corporation) and tungsten powder (average particle size, 0.5 micron, 5 wt. %) are dried at a temperature above 100° C. and then mixed. The resulting mixture is added to the hopper of a vibrating feeder of a Werner and Pfleiderer 28 mm ZSK extruder (twin screw), passed onto a vibrating trough, and fed into the extruder. The feeder, trough and throat of the extruder are under a positive nitrogen flow. Molten polymer at a temperature of 305–310° C. containing particulate tungsten exits from the extruder in two strands and is passed through a water bath. Thereafter, the cooled strands are fed into a pelletizer, and the pellets are passed through a #4 sieve to remove pellets with "tails." To ensure a uniform distribution of the particulate filler, the filled pellets are fed into the extruder and the process is repeated.

EXAMPLE 2

Preparation and Evaluation of Filled LCP Fiber

Filled fiber is melt spun from VECTRA polymer compounded with 1 wt. % of tungsten metal powder, as now described. Chips are fed to the hopper of a conventional extruder, and molten polymer at a temperature of about 320° C. containing particulate tungsten issues from the extruder. The mixture is passed to a metering pump (pump speed, 38 rpm; 0.584 cc/revolution), then through a conventional filter pack that includes a spinneret screen (15–25 microns), and through a spinneret (hole count, 40; hole diameter, 0.005"; hole length, 0.007"). The resultant filaments converge into a lubricant guide and onto a take up roll (2000 ft./min.), which forwards the filaments to a winder unit. Tungsten powder-filled LCP yarn of about 400 denier (forty filaments) is obtained. The filler is generally uniformly distributed throughout the fiber.

The melt spinning process is repeated with variation (0.1–2.0 wt. % tungsten; extrusion temperature, 310–325° C.; pump speed, 12–38 rpm; take-up speed, 500–2000 ft./min.; spinneret hole diameter, 0.005–0.013") to obtain tungsten powder-filled LCP yarns of a variety of deniers (forty filaments)- as shown in Table 1. The metal-filled fiber is evaluated for tensile properties on an Instron tensile tester. The results of the property measurements are presented in Table 1. Evaluation is conducted using the following test protocols: for tenacity, a ten-inch gauge length of the fiber with 2.5 twists per inch with a ten percent strain rate; and for modulus, ASTM D885.

TABLE 1

| % W | Denier | Tenacity (gpd) | Modulus (gpd) |
|---|---|---|---|
| 1.0 | 444 | 7.9 | 523 |
| " | 333 | 7.4 | 521 |
| " | 642 | 7.8 | 507 |
| " | 778 | 8.7 | 453 |
| 0.1 | 678 | 8.9 | 492 |
| 0.1 | 1020 | — | — |
| 0.5 | 639 | 8.4 | 516 |
| 2.0 | 439 | 7.4 | 474 |
| " | 724 | 7.7 | 482 |
| " | 770 | 8.1 | 455 |

TABLE 1-continued

| % W | Denier | Tenacity (gpd) | Modulus (gpd) |
|---|---|---|---|
| " | 847 | 7.4 | 444 |
| " | 1020 | — | — |

Note: "gpd" means grams/denier

TABLE 2

| | Cycles to Failure |
|---|---|
| 0.1% W | 259 |
| 0.5% W | 249 |
| 1.0% W | 251 |
| 2.0% W | 141 |
| Stainless steel wire | 2 |

In addition, as indicated in Table 2, tungsten powder-filled fiber made from VECTRA polymer is evaluated for folding endurance (ASTM D-2176). A one pound weight is used for tension. Stainless steel wire of 0.003" diameter is also tested. The samples are of comparable weight. Each result set forth in Table 2 represents the average value from ten trials. Superior flex/fold resistance is found for the tungsten-filled fiber compared to the- stainless steel wire.

Moreover, yarn from VECTRA polymer filled with tungsten powder (0.5, 1.0, 2.0 wt. % W with dpf respectively of 16.0, 19.5 and 11.0) is tested for tenacity loss from laundering. It is important that protective apparel can be repeatedly laundered without losing strength. The following washing procedure is used: Wash for 10 minutes at 60° C. in 0.1% concentrated detergent (sold under the registered trademark ARM & HAMMER®) in distilled water. Rinse for 10 minutes at 40° C. with distilled water. Fresh detergent/water is used for the wash, and fresh distilled water is used for the rinse. Samples are washed for 1, 3, 5, 10 and 15 cycles, and air dried after the final cycle. No tenacity loss is observed after fifteen wash cycles.

Also, yarn from VECTRA polymer filled with tungsten powder (0.5, 1.0, 2.0 wt. % W, with denier respectively of 624, 406 and 773) is tested for tenacity loss from bleach exposure (2.62% Chlorox, 5.24% Chlorox). Sufficient yarn is wrapped around a perforated stainless steel tube and immersed in the appropriate solution for the designated time (2, 12 and 24 hours). Thereafter, the yarn is rinsed with tap water and air dried. The dry yarn is wound on a small spool and tested using a ten inch gauge length with 2.5 twists per inch with a ten percent strain rate. Strength retention in excess of 85% is observed.

EXAMPLE 3

Evaluation of Cut Resistance of LCP Yarn

Gloves made of composite yarn constituted as shown in Table 3 are prepared. The high tensile strength polyethylene fiber is commercially available from Allied Corporation of New Jersey under the trademark SPECTRA®. The high tensile strength aramid fiber is commercially available from DuPont of Wilmington, Delaware under the trademark KEVLAR®.

A glove is slit up the side and one layer of fabric is removed for testing. The fabric is stretched in a circular sample holder 4 inches in diameter and pre-tensioned by applying a two pound force to the center of the circle. The test is performed in an Instron tensile tester. The circular sample holder is clamped into the tensile tester at a 45° angle with respect to the floor. The sample holder is raised in a direction perpendicular to the floor at a speed of 5" per minute so that the fabric meets a stationary (non-rotating) carbide blade at an angle, thereby simulating a slicing action. The fabric is mounted so that the knit of the fabric is perpendicular to the direction of the simulated slicing action. The force required for cutting through the fabric (in pounds) is measured by the tensile tester. The results are shown in Table 3. Comparative examples are labelled C-1 to C-6.

The benefit of a filled, compared to an unfilled, LCP fiber is clearly shown in Table 3. Cut resistance enhancement is particularly apparent when the 439 and 444 denier filled VECTRAN® M fibers (Examples 3-3 and 3-4) are compared with the 400 denier, unfilled VECTRAN M fiber (Example C-4). Similar conclusions can be reached by comparing Examples 3-1 and 3-2 with Example C-1. Thus it is readily apparent that the cut resistance of LCP fibers improves when as little as about 1% to about 2% by weight of hard filler is present in the fiber. This is equivalent to about 0.07% to about 0.14% by volume for tungsten filler. Also shown is the superiority of a filled LCP fiber to an unfilled, high tensile strength polyethylene fiber. The VECTRAN M fiber is also more heat resistant than the polyethylene fiber. The aramid fiber cannot withstand exposure to bleach, so that the filled VECTRAN M fiber is advantageous compared with aramid when the fiber is exposed to bleach during use or laundering.

TABLE 3

| | Core | 1st Wrap | 2nd Wrap | Slash (lb) |
|---|---|---|---|---|
| 3-1 | 650 denier HS PE | 847 denier V/2% W | 847 denier V/2% W | 5.2 |
| 3-2 | 650 denier HS PE | 778 denier V/1% W | 778 denier V/1% W | 5.8 |
| C-1 | 650 denier HS PE | 750 denier VECTRAN M | 750 denier VECTRAN M | 4.8 |
| C-2 | 650 denier HS PE | 1000 denier HS aramid | 1000 denier HS aramid | 4.4 |
| C-3 | 650 denier HS PE | 650 denier HS PE | 650 denier HS PE | 2.9 |
| 3-3 | 650 denier HS PE | 439 denier V/2% W | 439 denier V/2% W | 4.2 |
| 3-4 | 650 denier HS PE | 444 denier V/1% W | 444 denier V/1% W | 4.1 |
| C-4 | 650 denier HS PE | 400 denier VECTRAN M | 400 denier VECTRAN M | 2.6 |
| C-5 | 650 denier HS PE | 400 denier HS aramid | 400 denier HS aramid | 2.5 |
| C-6 | 650 denier HS PE | 375 denier HS PE | 375 denier HS PE | 2.9 |

"HS" means high tensile strength;
"PE" means polyethylene;
"V" means VECTRAN M

EXAMPLE 4

Poly(ethylene terephthalate) fibers incorporating tungsten powder filler are described below. Tungsten has a Mohs Hardness value of about 6.5 to 7.5. Tire yarn grade poly (ethylene terephthalate) (PET), having an intrinsic viscosity of about 0.95 when measured in o-chlorophenol, is obtained from Hoechst Celanese Corporation, Somerville, N.J. in the form of pellets. A master batch is made by blending the polymer with 10% tungsten powder on a weight basis in a twin screw extruder. The tungsten has an average particle size of about 1 micron. The polymer pellets and tungsten are both dried before blending. The master batch is blended with additional PET in a twin screw extruder to yield blends having 1% and 4% tungsten on a weight basis. The samples are melt spun by forcing the molten blend first through a filter pack and then through a spinneret. The yarn is subsequently drawn off a heated feed roll at 90° C., then drawn over a heated shoe, and finally subjected to a 2% relaxation at 225° C. The yarn is plied for testing of properties. The data are summarized in Table 4. One of the 10% tungsten-loaded fibers is also analyzed for tungsten to ensure that the filler is not filtered out. The analysis of the fiber shows about 8.9% by weight tungsten in the fiber.

Tensile properties. The tenacity, elongation and modulus are measured using ASTM test method D-3822.

Cut resistance. The fiber is first knitted into fabric for the testing of cut resistance. The areal density of yarn in the fabric is measured in ounces/square yard (OSY in Tables 4 and 5). The cut resistance of the fabric is then measured using the Ashland Cut Performance Protection ("CPP") test. The test was carried out at TRI/Environmental, Inc., 9063 Bee Cave Road, Austin, Tex. 78733-6201. In the test, the fabric sample is placed on the flat surface of a mandrel. A series of tests is carried out in which a razor blade loaded with a variable weight is pulled across the fabric until the fabric is cut all the way through. The distance the razor blade travels across the cloth until the blade cuts completely through the cloth is measured. The point at which the razor blade cuts through the fabric is the point at which electrical contact is made between the mandrel and razor blade. The distance required to make the cut is plotted on a graph as a function of the load on the razor blade. The data are measured and plotted for cut distances varying from about 0.3 inches to about 1.8 inches. The resulting plot is approximately a straight line. An idealized straight line is drawn or calculated through the points on the plot, and the weight required to cut through the cloth after one inch of travel across the cloth is taken from the plot or calculated by regression analysis. The interpolated values of the weight required to make a cut after one inch of blade travel across the cloth are shown in Tables 4 and 5 as "CPP", an abbreviation for Cut Protection Performance. Finally, for purposes of comparing the data for different thicknesses of cloth sample, the CPP value is divided by the thickness of the cloth (OSY) to compensate for variations in cloth thickness. This value is shown as CPP/OSY in Tables 4 and 5. The cut resistance data for tungsten-filled PET fiber are presented in Table 4.

EXAMPLE 5

In these experiments, PET fiber samples are filled with alumina powder, which is sold commercially under the trademark MICROPOLISH® II as a polishing abrasive. Two different alumina powders are used having average particle sizes of about 0.05 microns and about 1.0 microns. Both are obtained as deagglomerated powders from Buehler, Ltd., Waukegan Road, Lake Bluff, Ill. 60044. The 0.05 micron alumina is gamma alumina with a cubic crystal structure and a Mohs Hardness Value of 8. The 1.0 micron material is alpha alumina having a hexagonal crystal structure and a Mohs Hardness Value of 9. The two alumina powders are blended with PET using the same method as in Example 4 to yield filled PET samples containing alumina at levels of about 0.21%, 0.86%, 1.9% and 2.1% by weight. Measurements of fiber properties and cut resistance are made using the same methods as in Example 4. The data are presented in Table 5.

The data in Tables 4 and 5 show that there is an improvement in cut resistance of at least about 10% to about 20% at all levels of filler used. Both sets of data incorporate filler in the fiber at levels of about 0.07% to about 0.7% on a volume basis. The fiber properties do not appear to significantly degrade with these amounts and sizes of particles.

EXAMPLE 6

A series of experiments was run using tungsten particles of several different particle sizes (0.6–1.6 microns) as fillers in PET at concentrations of 0.4–1.2 volume %. The tungsten-filled PET was spun into yarn, which was subsequently knitted into fabric for testing. Cut resistance was again measured by the Ashland Cut Protection Performance Test, using the modified procedure described below. The CPP values were divided by the areal densities of the cloth to correct for the fact that the tests were carried out on different densities of cloth. The data are presented in Table 6.

Cut Protection Performance (CPP)

The Ashland CPP Test was run as described at the end of Example 4, but a calibration against a standard with a known CPP value was used to correct the results for lot-to-lot variations in razor blade sharpness. This procedure was used for the data in Tables 6 and 7, and Examples 7–15.The calibration standard was 0.062 inch neoprene, style NS-5550, obtained from FAIRPRENE, 85 Mill Plain Road, Fairfield, Conn. 06430, which has a CPP value of 400 gms. The CPP value was measured for this standard at the beginning and end of a series of tests, and an average normalization factor was calculated that would bring the measured CPP value of the standard to 400 gms. The normalization factor was then used to correct the measured data for that series of tests. Also, in calculating the CPP value, a plot of the logarithm of the distance required to cut the fabric vs. the load on the razor blade was utilized, as it was more linear.

EXAMPLE 7

A series of experiments was run using calcined aluminum oxide as the filler for the fiber. The experiments were run using the same procedure as used in previous examples, but with a broader range of particle sizes (0.5–3 microns) and a wider range of concentrations (0.8–3.2 volume %) than in Example 5.

The calcined aluminum oxide used in the experiments was obtained from Agsco Corporation, 621 Route 46, Hasbrouck, N.J. 07604, and is in the form of platelets, referred to as Alumina #1.

The CPP values were measured using the procedure described at the end of Example 6. The CPP/OSY values were then calculated as described above. These data are presented in Table 7.

It can be seen from the data in the tables that the CPP/OSY values are affected by all of the variables listed (i.e., particle size, particle concentration, areal density, and the fiber dpf). At the high areal densities (OSY), the CPP/OSY values fall off significantly. Thus comparisons are preferably made for tests on fabrics having similar areal densities.

Nevertheless, it can be seen from the data in Table 4 that at a level of 2.4 volume % (6.8 weight %), with a particle size of 2 microns, the CPP/OSY values for fabrics made from textile fibers (2.8 dpf) and having areal densities of less than about 10 ounces per square yard were greater than about 100. (Sample Nos. 22–24 and 30). This is much more than a 50% increase over the average CPP/OSY value of about 53 that was measured for unfilled PET fiber of comparable fiber size and areal density (the three Controls in Table 1). The average CPP/OSY values for all the tungsten filled PET samples of Table 6 (70) and all the aluminum oxide filled PET samples of Table 7 (75) are also significantly higher than the average of the controls.

EXAMPLE 8

A sample of 0.05 micron alumina from Buehler was compounded on a Haake conical twin screw extruder with poly(ethylene terephthalate) (PET) to make a 2% by weight compound of alumina in PET. This was then melt spun into yarn. The yarn was drawn prior to measurement of the tensile properties and cut resistance. A control sample of unfilled PET was also made into a yarn and drawn. The unfilled yarn had a denier of 8.6 dpf (denier per filament), and the filled yarn had a denier of 6.3 dpf. The tensile properties, measured using ASTM test method D-3822, for the unfilled fiber were 5.3 gpd tenacity, 10% elongation, 104 gpd modulus, and for the filled fiber were 7.8 gpd tenacity, 10% elongation, 129 gpd modulus. These yarn samples were then knitted directly into gloves on a 7 guage Shima Seiki knitting machine. Finally the cut resistance was measured using the Ashland Cut Protection Performance test described in Example 6. The CPP values and areal density (OSY) for the unfilled glove were 1291 g and 26 ounces per square yard and for the filled glove were 1083 g and 20 ounces per square yard. The normalized cut resistance values (CPP/OSY) are 49 for the control sample and 54 for the filled sample, which is an increase of about 10%. This shows that a large amount of very small particles does not increase the CPP/OSY value (and thus the CPP value for the same weight of fabric) by more than about 10%.

The particle size distribution was also measured by scanning electron microscopy to determine the actual particle size distribution. The average particle size was listed as 0.05 micron by the manufacturer. The measured particle size distribution was spread over the range from 0.05 micron to 1.32 microns and peaked at 0.11 microns. The mean particle size was 0.31 microns, and the median was 0.23 microns.

Note that the data in this example do not completely agree with the data in Table 5 (Examples 5-3, 5-4, 5-7, and 5-8), which was obtained using the CPP test without the calibration procedure described in Example 6. The modified test method was developed later in time than the data in Tables 4 and 5 and appears more reliable (i.e. there is less scatter) than the earlier data in Tables 4 and 5.

EXAMPLE 9

One difficulty in making and using the cut resistant fibers and yarns described herein is the abrasiveness of the filled fibers, which causes faster wear of the equipment used to process the fiber. It has been found that a sheath/core heterofil can be made comprising the filled fiber in the core, with a sheath of unfilled fiber. The sheath core fibers and yarns are made using conventional bicomponent fiber spinning equipment. The core and sheath do not need to be made from the same polymer, but use of the same polymer for both eliminates potential problems of adhesion between the layers and simplifies the process. The filled fiber composition is the same as previously taught. Even with a sheath of unfilled polymer, the cut resistance values by the CPP test are raised by at least 10% (and higher values, as previously taught). The cut resistance is higher when less sheath is used, with 10% by volume of sheath polymer giving good CPP values and a smooth fiber. It is contemplated that the sheath could be as low as about 5% by volume up to as much as 50% by volume, with the overall increase in cut resistance being proportional to the amount of filled fiber in the sheath/core fiber.

As an example, PET was compounded with 6% by weight of alumina (Grade #1 calcined alumina from Agsco Corp., having 2 micron average particle size). This was melt spun into a sheath/core bicomponent fiber, with unfilled PET being the sheath polymer. The sheath comprised 10% of the volume of the fiber, which was smooth and slick. The yarn was six-plied, drawn and textured. The denier after drawing was 460/114, or about 4 dpf. The plied, textured yarn was knit into gloves having two different fabric weights. The CPP values and CPP/OSY values were measured for each. The results follow: (1) 8.6 OSY, 1063 g CPP value; 124 is the CPP/OSY value; (2) 15 OSY, 1568 g CPP value; 104 is the CPP/OSY value. These are comparable with the expected values for filled PET without a sheath.

The cross section of the fiber was examined under a microscope. It can be seen that the particles are in the core of the fiber and do not protrude above the surface, giving the surface a smooth appearance, as well as a smoother feel.

EXAMPLE 10

Calcined alumina (Grade No. 1 from Agsco), having an average particle size of about 2 microns, was blended at a level of 6% by weight of the polymer in a spinning dope which contained aramid at a level of 6% by weight, available under the name TREVAR™, dissolved in N-methylpyrrolidinone (NMP). The aramid is a copolymer of terephthalic acid with the following three diamines in a 2:1:1 ratio: 3,3'-dimethylbenzidine, p-phenylenediamine, and 1,4-bis-(4-aminophenoxy)-benzene. The aramid was wet spun and then drawn at 380° with a draw ration of 11:1 to yield a yarn having a denier of 4 dpf, tenacity 22 gpd, and modulus 675 gpd. A control sample of unfilled aramid was also wet spun into a yarn having a denier of 5.3 dpf, tenacity 26 gpd, and modulus 711 gpd. Comparative samples of PET containing 6% by weight alumina (same alumina as above) were also run. The yarns were knit into gloves, and the cut resistance of fabric from the gloves was tested. The cut resistance values are tabulated in Table 8. The cut resistance of the filled aramid is clearly the highest.

EXAMPLE 11

Calcined alumina (Grade No. 1, Agsco, average particle size of 2 microns) was compounded at a level of 6% by weight with polyethylene naphthalate (PEN) in a conical twin screw extruder. The filled PEN was melt spun and drawn to yield a yarn having 5.7 gpd tenacity and 165 gpd modulus. The yarns were textured and knit to gloves. The cut resistance values of two fabric samples from the gloves having different OSY values follow: (1) 12.7 OSY; CPP, 1250 g; CPP/OSY, 99; (2) 16 OSY; CPP, 1695 g; CPP/OSY, 106.

The filled samples of PEN had higher values of CPP/OSY than either filled PET or unfilled PEN. Unfilled PEN in the form of a wrapped yarn in a 7 gauge glove has the following cut resistance: 21.2 OSY; CPP 867 g; CPP/OSY, 41.

EXAMPLE 12

Calcined alumina (Grade No. 1 from Agsco, average particle size 2 microns) is compounded at a level of 7 weight % with high molecular weight polyethylene having a weight average molecular weight of about 150,000. This polyethylene is sold commercially in fiber form as an extended chain polyethylene under the CERTRAN® trademark. The filled polymer is melt spun to yield a filled high modulus fiber after drawing at a 20:1 ratio. The yarn has a CPP value that is improved by about 45%. The spinning process is taught in U.S. Pat. Nos. 4,287,149; 4,415,522; and 4,254,072, incorporated herein by reference. Similarly, extended chain polyethylene fiber containing filler particles is also made by the gel spinning of particle filled ultrahigh molecular weight polyethylene by the process taught in U.S. Pat. Nos. 4,356,138, 4,413,110, and 4,663,101 which are incorporated herein by reference.

EXAMPLE 13

PET yarn which had been filled with 6% by weight of calcined alumina (2 micron particle size) was wrapped around 3 mil stainless steel wire at about 8 turns per inch to make a composite yarn (also referred to as a wrapped yarn). Some unfilled PET was also included. For comparison, a sample of PET was wrapped around the same kind of wire to determine the effect of the filler on the wrapped yarn. The two composite (wrapped) yarns had the following compositions and cut resistance values:

(1) 3 mil stainless steel wire (19 weight %), filled PET yarn (70%), unfilled PET yarn (11%). This yarn was knit into a glove. A fabric sample from the glove had a weight of 16 OSY, a CPP value of 3648 g, and CPP/OSY of 230.

(2) 3 mil stainless steel wire (18 weight %), unfilled PET yarn (82%). This yarn was also knit into a glove. A fabric sample from the glove had a weight of 18 OSY, a CPP value of 3310 g, and a CPP/OSY value of 188.

EXAMPLE 14

A 6% alumina-filled PET yarn (2 micron particle size) was wrapped around a core of glass fiber (G75, from PPG) at about 8 turns per inch. The fiberglass is a 600 denier yarn having a filament diameter of 9 microns. The wrapped yarn (also referred to as a composite yarn or combination yarn) consisted of 21% glass fiber and 79% filled PET. A control sample similar to this but using unfilled PET was made for purposes of comparison. Both yarns were knit into gloves for testing purposes. A sample of fabric from the glove containing filled PET had a weight of 21 OSY, a CPP rating of 2423 g, and CPP/OSY of 117. A sample of the control fabric had a weight of 23 OSY, a CPP value of 2238 g, and a CPP/OSY value of 96.

EXAMPLE 15

Non-woven fabrics, also known as non-woven webs and mats, can also be made more cut-resistant in accordance with the present invention. This example demonstrates non-woven spun-bonded fabrics. A spun-bonded non-woven fabric was made from PET containing 6% alumina (weight %) having a 2 micron particle size. The polymer was spun at 8 lbs./hr. and about 300° C. through a spinneret with 90 holes having 0.5 mm diameter. The fiber was attenuated by a high speed nozzle (i.e. an air jet) to about 250:1 draw ratio. The fiber was caught as a web on a 4 ft.×4 ft. perforated metal plate. The mat was needle punched to promote cohesion between the fibers. For comparison, a web was also made using unfilled PET. The web made from the unfilled PET had a weight of 9.4 OSY, a CPP value of 684 g, and a CPP/OSY value of 73. The filled PET web had a weight of 9.3 OSY, a CPP value of 951 g, and a CPP/OSY value of 102.

Heterofil spun-bonded mats are also made in which a lower melting polymer and the filled PET described above are passed through a bicomponent spinneret so that the lower melting polymer is the sheath of a sheath-core fiber. The individual filaments, are attenuated as they exit the spinnerets and are passed onto a perforated plate, belt, or the like. Cohesion between the fibers is increased by compressing the fiber mat at a high enough temperature to melt the sheath polymer but not so high that the core melts. Examples of lower melting sheath polymers include poly(butylene terephthalate), polyethylene, and polypropylene.

Non-woven fabrics using cut-resistant fibers can be made by any of the methods commonly used to make non-woven fabrics. For example, they can be spun-bonded as described above, and the webs can be made more cohesive by numerous methods, such as needle punching, use of adhesive, and point bonding by localized melting in specific spots. Applications for such non-wovens include cut and sew gloves, cut and bond gloves, other apparel where the fabric is cut and then sewn or bonded to form the item of apparel, upholstery, luggage, covers, and tarpaulins, all with enhanced cut resistance.

It is to be understood that the above described embodiments of the invention are illustrative only and that modification throughout may occur to one skilled in the art. Accordingly, this invention is not to be regarded as limited to the embodiments disclosed herein.

TABLE 4

Cut Resistance of PET Filled with Tungsten

| No. | % Tungsten Wt. | Volume | Particle Size (microns) | dpf | T/E/M[1] | CPP[2] | OSY[3] | CPP/OSY |
|---|---|---|---|---|---|---|---|---|
| Control 1 | — | — | — | 3.1 | 6.8/6.7/124 | 421 | 7.1 | 59 |
| Control 2 | — | — | — | 5.0 | — | 384 | 6.8 | 56 |
| Control 3 | — | — | — | 5.0 | — | 589 | 13.0 | 45 |
| 4-1 | 1% | 0.07% | 1 micron | 6.0 | 6.3/9.0/128 | 540 | 9.1 | 59 |
| 4-2 | 1% | 0.07% | 1 micron | 5.6 | — | 565 | 7.3 | 77 |
| 4-3 | 4% | 0.29% | 1 micron | 6.0 | 7.2/11.6/109 | 643 | 7.0 | 92 |
| 4-4 | 4% | 0.29% | 1 micron | 5.9 | 7.0/12.5/100 | 620 | 7.3 | 85 |
| 4-5 | 10% | 0.72% | 1 micron | 11.6 | 6.3/10.0/123 | 697 | 7.5 | 93 |
| 4-6 | 10% | 0.72% | 1 micron | 7.4 | 4.1/22.9/75 | 759 | 8.5 | 90 |
| 4-7 | 10% | 0.72% | 1 micron | 6.0 | — | 670 | 7.6 | 89 |

[1]Tenacity (gpd), Elongation (%), Modulus (gpd), measured using ASTM test method D-3822.
[2]Cut Protection Performance, measured using the Ashland CPP test.
[3]Ounces per Square Yard.

TABLE 5

Cut Resistance of PET Filled with Alumina

| No. | % Alumina Wt. | Volume | Particle Size (microns) | dpf | T/E/M[1] | CPP[2] | OSY[3] | CPP/OSY |
|---|---|---|---|---|---|---|---|---|
| 5-1 | 0.21% | .07% | 1 micron | 11.4 | 6.7/10.3/112 | 547 | 7.2 | 76 |
| 5-2 | 0.21% | .07% | 1 micron | 5.6 | 7.4/12.4/104 | 463 | 7.5 | 62 |
| 5-3 | 0.86% | 0.30% | 0.05 micron | 5.6 | 7.4/14.0/110 | 501 | 7.3 | 69 |
| 5-4 | 0.86% | 0.30% | 0.05 micron | 5.7 | 6.9/12.8/110 | 497 | 6.7 | 73 |
| 5-5 | 1.9% | 0.67% | 1 micron | 11.8 | 5.8/12.0/108 | 683 | 8.2 | 83 |
| 5-6 | 1.9% | 0.67% | 1 micron | 5.6 | 7.4/10.9/108 | 478 | 6.7 | 71 |
| 5-7 | 2.1% | 0.74% | 0.05 micron | 5.4 | 6.6/11.6/117 | 496 | 6.7 | 74 |
| 5-8 | 2.1% | 0.74% | 0.05 micron | 5.9 | 5.4/12.8/100 | 431 | 6.2 | 69 |

[1]Tenacity (gpd), Elongation (%), Modulus (gpd), measured using ASTM test method D-3822.
[2]Cut Protection Performance, measured using the Ashland CPP test.
[3]Ounces per Square Yard.

TABLE 6

Cut Resistance of PET Filled with Tungsten

| SAMPLE # | PARTSIZE (micron) | CONC (vol %) | DPF | TENACITY (gpd) | ELONG (%) | MODULUS (gpd) | OSY (oz/yd2) | CPP | CPP/OSY |
|---|---|---|---|---|---|---|---|---|---|
| 1 | 0.6 | 0.4 | 10 | 7.3 | 9 | 112 | 8 | 562 | 70 |
| 2 | 0.8 | 1.2 | 10 | 5.5 | 13 | 102 | 9.5 | 557 | 59 |
| 3 | 1.4 | 0.4 | 10 | 6 | 14 | 96 | 8.2 | 714 | 87 |
| 4 | 1.6 | 1.2 | 10 | 5.9 | 11 | 100 | 8.2 | 821 | 100 |
| 5 | 1 | 0.8 | 10 | | | | 8 | 708 | 89 |
| 6 | 0.8 | 0.8 | 10 | 5.7 | 8 | 109 | 7 | 724 | 103 |
| 7 | 0.6 | 0.8 | 10 | 5.9 | 13 | 118 | 6.8 | 621 | 91 |
| 8 | 0.8 | 0.8 | 10 | 5.7 | 8 | 109 | 7 | 596 | 85 |
| 9 | 0.6 | 0.8 | 10 | 6.3 | 13 | 103 | 7.9 | 703* | 89 |
| 10 | 1.5 | 0.8 | 12 | 6.7 | 9 | 102 | 7.6 | 644 | 85 |
| 11 | 0.6 | 0.8 | 2.4 | | | | 13.6 | 656 | 48 |
| 12 | 1 | 0.8 | | 7.2 | 8 | 108 | 7.5 | 503 | 67 |
| 13 | 0.6 | 0.8 | 2.4 | | | | 28 | 1226 | 44 |
| 14 | 0.6 | 0.8 | 2.4 | | | | 19 | 964 | 51 |
| 15 | 0.6 | 0.8 | 2.4 | | | | 26 | 1225 | 47 |
| 16 | 0.6 | 0.8 | 10 | | | | 20 | 900 | 45 |
| 17 | 0.6 | 0.8 | 2.4 | | | | 12 | 628 | 52 |
| 18 | 0.6 | 0.8 | 1.4 | | | | 16 | 685 | 43 |
| 19 | 0.6 | 0.8 | 1.4 | | | | 7 | 580 | 80 |

PARTSIZE is Particle size, measured in microns.
CONC is the concentration of hard particles, measured as a volume % in PET.
DPF is the fiber denier in dpf.
TENACITY, ELONG, and MODULUS are the fiber tensile properties, measured by ASTM test method D-3822.
OSY is the areal density of the knitted fabrics, measured in ounces per square yard.
CPP is the CPP value measured by the Ashland CPP test.
CPP/OSY is the ratio of the CPP value to the areal density (OSY).
*- measured by the method described in Example 4.

TABLE 7

Cut Resistance of PET filled with Alumina

| SAMPLE # | PARTSIZE (micron) | CONC (vol %) | DPF | TENACITY (gpd) | ELONG (%) | MODULUS (gpd) | OSY (oz/yd2) | CPP | CPP/OSY |
|---|---|---|---|---|---|---|---|---|---|
| 1 | 0.6 | 2.4 | 3 | | | | 22 | 1285 | 58 |
| 2 | 0.6 | 0.8 | 10 | 6.6 | 15 | 109 | 10 | 990* | 99 |
| 3 | 0.6 | 1.6 | 10 | 5.2 | 17 | 100 | 12 | 912 | 76 |
| 4 | 0.6 | 2.4 | 10 | 5.8 | 9 | 107 | 10 | 823 | 82 |
| 5 | 0.6 | 3.2 | 10 | 4.8 | 14 | 93 | 10 | 852 | 85 |
| 6 | 0.6 | 2.4 | 3 | | | | 19 | 1074 | 57 |
| 7 | 0.6 | 2.4 | 3 | | | | 9 | 487 | 54 |
| 8 | 3 | 2.4 | 3.6 | 5 | 23 | | 16 | 1234 | 77 |

TABLE 7-continued

Cut Resistance of PET filled with Alumina

| SAMPLE # | PARTSIZE (micron) | CONC (vol %) | DPF | TENACITY (gpd) | ELONG (%) | MODULUS (gpd) | OSY (oz/yd2) | CPP | CPP/OSY |
|---|---|---|---|---|---|---|---|---|---|
| 9 | 3 | 2.4 | 3.6 | 5 | 23 | | 11 | 981 | 89 |
| 10 | 0.5 | 2.4 | 1.4 | 4.9 | 22 | | 15 | 810 | 54 |
| 11 | 0.5 | 2.4 | 1.4 | 4.9 | 22 | | 13 | 623 | 48 |
| 12 | 3 | 2.4 | 3.1 | 3.4 | 19 | | 18 | 1555 | 86 |
| 13 | 0.5 | 2.4 | 5.5 | | | | 23 | 1197 | 52 |
| 14 | 0.5 | 2.4 | 5.5 | | | | 21 | 1082 | 52 |
| 15 | 0.6 | 2.4 | 6.4 | | | | 23 | 1242 | 54 |
| 16 | 0.6 | 2.4 | 5.5 | | | | 19 | 1505 | 79 |
| 17 | 0.5 | 2.4 | 6.7 | | | | 8 | 597 | 75 |
| 18 | 0.6 | 2.4 | 4 | | | | 13 | 818 | 63 |
| 19 | 3 | 2.4 | 3.1 | | | | 15 | 1370 | 91 |
| 20 | 3 | 2.4 | 3.1 | | | | 15 | 1283 | 88 |
| 21 | 2 | 2.4 | 2.8 | 5 | 15 | 80 | 18 | 1562 | 87 |
| 22 | 2 | 2.4 | 2.8 | 5 | 15 | 80 | 9 | 905 | 101 |
| 23 | 2 | 2.4 | 2.8 | 5 | 15 | 80 | 5 | 611 | 122 |
| 24 | 2 | 2.4 | 2.8 | 5 | 15 | 80 | 5 | 615 | 123 |
| 25 | 2 | 2.4 | 2.8 | 5 | 15 | 80 | 11 | 785 | 71 |
| 26 | 2 | 2.4 | 2.8 | 5 | 15 | 80 | 17 | 1593 | 94 |
| 27 | 2 | 2.4 | 2.8 | 5 | 15 | 80 | 17 | 1506 | 89 |
| 28[1] | 2 | 2.4 | 2.8 | 5 | 15 | 80 | 36 | 1022 | 28 |
| 29 | 2 | 2.4 | 2.8 | 5 | 15 | 80 | 18 | 1573 | 87 |
| 30 | 2 | 2.4 | 2.8 | 5 | 15 | 80 | 9 | 956 | 106 |
| 31 | 3 | 1.2 | 10 | | | | 23 | 1414 | 62 |
| 32 | 0.6 | 2.4 | 6.4 | | | | 18 | 1084 | 60 |
| 33 | 0.6 | 2.4 | 6.4 | | | | 21 | 996 | 47 |
| 34 | 3 | 2.4 | 4.2 | | | | 14 | 1079 | 77 |
| 35 | 3 | 2.4 | 4.2 | | | | 11 | 883 | 80 |
| 36 | 1 | 2.4 | 12.9 | | | | 7.3 | 943 | 129 |

PARTSIZE is Particle size, measured in microns.
CONC is the concentration of hard particles, measured as a volume % in PET.
DPF is the fiber denier in dpf.
TENACITY, ELONG, and MODULUS are the fiber tensile properties, measured by ASTM test method D-3822.
OSY is the areal density of the knitted fabrics, measured in ounces per square yard.
CPP is the CPP value measured by the Ashland CPP test.
CPP/OSY is the ratio of the CPP value to the areal density (OSY).
*- measured by the method described in Example 4.
[1]- OSY is high and CPP/OSY is low because the glove is plastic coated to improve the gripping performance.

TABLE 8

| | OSY | CPP | CPP/OSY |
|---|---|---|---|
| TREVAR Aramid (unfilled) | 3.7 | 379 | 102 |
| TREVAR Aramid plus Alumina | 4.6 | 951 | 205 |
| PET plus Alumina | 4.3 | 516 | 120 |

What is claimed is:

1. A cut-resistant fiber comprising a fiber-forming polymer comprising polyethylene having a molecular weight suitable for making extended chain polyethylene and a hard filler distributed uniformly in said fiber, said fiber having a denier in the range of about 1 to about 50 dpf; said filler having a Mohs Hardness Value greater than 3, said filler being present in an amount of about 0.05% to about 20% by weight, said filler being selected from the group consisting of a powder having an average diameter up to 20 microns, an elongated particle having an average length up to 20 microns, and mixtures thereof; said filler being included in sufficient quantity to improve the cut resistance by at least 10% compared with a fiber comprising said polymer without said filler as measured by the Ashland Cut Protection Performance Test.

2. A cut-resistant fiber as recited in claim 1, wherein the cut resistance of said fiber is improved by at least 20% compared with a fiber comprising said polymer without said filler.

3. A cut-resistant fiber as recited in claim 1, wherein said fiber is made by a method selected from gel spinning and melt spinning.

4. A cut-resistant fiber as recited in claim 1, wherein said filler has an average particle size in the range of about 0.25 microns to about 10 microns and is included in an amount of about 0.1% to about 5% by volume.

5. A cut-resistant fiber as recited in claim 4, wherein said filler is calcined alumina.

6. A cut-resistant fiber as recited in claim 4, wherein said filler is selected from the group consisting of iron, steel, nickel, tungsten, and mixtures thereof.

* * * * *

UNITED STATES PATENT AND TRADEMARK OFFICE
CERTIFICATE OF CORRECTION

PATENT NO. : 6,103,372
DATED : August 15, 2000
INVENTOR(S) : Sandor et al.

Page 1 of 1

It is certified that error appears in the above-identified patent and that said Letters Patent is hereby corrected as shown below:

Title page,
Item [75] Inventors, please cancel the following inventors:
"Edward Ronald Kafchinski, Winfield; Mohammed Ishaq Haider, Bernardsville, both of N.J."
Item [56] References Cited, U.S. PATENT DOCUMENTS,
Line 3, "Sulton" should read -- Sutton --.

Columns 19-20,
Table 7, last column, under sub-heading "CPP/OSY",
Line 12, "88" should read -- 86 --.

Signed and Sealed this

Eleventh Day of September, 2001

Attest:

*Nicholas P. Godici*

NICHOLAS P. GODICI
*Attesting Officer*   *Acting Director of the United States Patent and Trademark Office*